Feb. 22, 1949. J. M. STEIN 2,462,232
CONTROL MEANS
Filed June 8, 1946
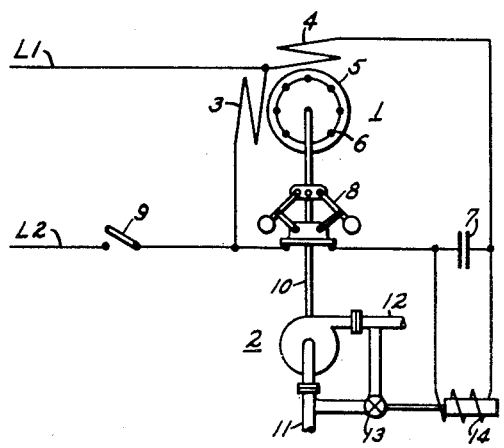
WITNESSES:
INVENTOR
Joseph M. Stein.
BY
ATTORNEY Patented Feb. 22, 1949

2,462,232

UNITED STATES PATENT OFFICE 2,462,232

CONTROL MEANS

Joseph M. Stein, Irwin, Pa., assignor to Westinghouse Electric Corporation, East Pittsburgh, Pa., a corporation of Pennsylvania Application June 8, 1946, Serial No. 675,339

6 Claims. (Cl. 230—22)

The present invention relates to the control of devices associated with single-phase induction motors of the capacitor-start type and, more particularly, to means for controlling a device associated with such a motor which is to be energized, or actuated, during starting of the motor.

There are many applications of single-phase motors in which a device associated with the motor, or with a device driven by the motor, is to be operated or energized during starting of the motor. One example of such an application is in the case of a motor driving a compressor. In many instances, such motors may not develop sufficient starting torque to come up to speed against the load of the compressor, especially if the line voltage should be low, or if other adverse conditions occur, and in such cases the motor cannot accelerate the load to normal speed. Unloader valves are often used with compressors for the purpose of unloading the compressor while the motor is starting, so as to enable the motor to come up to speed before the full load is applied. Such valves, therefore, must be operated while the motor is starting, and must be closed when the motor comes up to speed. Various means have been used for actuating unloaders, such as centrifugal devices which are responsive to the speed of the compressor, but such devices of course add considerably to the cost of an installation. There are also various other types of equipment which may be driven by, or associated with, single-phase motors, and the present invention is applicable generally to any device which is to be actuated or energized during starting of the motor. The principal object of the invention, therefore, is to provide a simple and reliable means for actuating a device associated with a single-phase induction motor of the capacitor-start type, which is to be actuated or energized during starting of the motor.

A further object of the invention is to provide a control means for a device associated with a single-phase motor of the capacitor-start type which utilizes the voltage across the capacitor for actuating the device during starting of the motor.

A more specific object of the invention is to provide control means for an unloader valve for a compressor driven by a single-phase motor of the capacitor-start type, which utilizes the voltage across the capacitor for actuating the valve during starting of the motor.

Other objects and advantages of the invention will be apparent from the following detailed description, taken in connection with the accompanying drawing, in which the single figure is a schematic diagram showing a preferred embodiment of the invention.

The drawing shows the invention applied to a single-phase motor 1 driving a compressor 2. The motor 1 is a single-phase motor of the capacitor-start type, and has a main primary winding 3 and an auxiliary primary winding 4. The motor also has a rotor 5 carrying any suitable type of secondary winding, shown as a squirrel-cage winding 6. The primary windings 3 and 4 are displaced from each other on the stator of the motor, as diagrammatically indicated, and are connected in parallel across a single-phase supply line L1, L2. A capacitor 7 is connected in series with the auxiliary winding 4 to produce the necessary phase displacement between the currents in the main and auxiliary windings 3 and 4, and a speed-responsive switch 8 is provided to open the circuit of the auxiliary winding 4 when the motor 1 has accelerated to a predetermined speed. The switch 8 is shown as a centrifugal switch, but it will be understood that any type of switch may be used which will open the circuit of the winding 4 when the motor reaches the desired speed. A line switch 9 is provided for controlling the motor 1.

The compressor 2 is shown as a centrifugal compressor, driven directly from the motor shaft 10, and having an intake pipe 11 and a discharge pipe 12. The compressor 2 is provided with an unloader valve 13 which is connected between the intake and discharge pipes 11 and 12, so that when the valve 13 is opened, the compressor is bypassed through the valve 13, and the driving motor 1 is unloaded. The unloader valve 13 is operated by means of a solenoid 14, and is arranged so that the valve is opened when the solenoid is energized. The solenoid 14 is connected directly across the capacitor 7 in the circuit of the auxiliary primary winding 4 to be energized by the voltage across the capacitor. It will be obvious that the solenoid 14 might also be connected in any other suitable manner to be energized in response to the voltage across the capacitor 7, so that the solenoid 14 is energized whenever a voltage appears across the capacitor 7.

The operation of this control system should now be apparent. When it is desired to start the compressor, the line switch 9 is closed to energize the motor 1. Since the speed-responsive switch 8 is closed when the motor is at rest, both the main and auxiliary primary windings are connected in parallel across the supply line L1, L2 and the motor 1 starts. As soon as the line switch 9 is closed, a voltage appears across the capacitor 7, since it is connected directly across the line in series with the auxiliary winding 4, and the solenoid 14 is energized by this voltage across the capacitor. As soon as the solenoid 14 is energized, it actuates the valve 13 to open the valve and unload the compressor. Thus the motor 1 needs to develop only enough starting torque to overcome the inertia of the impeller of the compressor 2, and the motor is only lightly loaded during starting, instead of having to start against the full load of the compressor.

When the motor has accelerated to the predetermined speed, which is usually of the order of 70% to 80% of full-load speed, the speed-responsive switch 8 opens its contacts and disconnects the auxiliary winding 4 and capacitor 7 from the line. The capacitor 7 has some charge on it when the switch 8 opens, and it will discharge through the solenoid 14, maintaining its energization for a short time after the switch 8 has disconnected the auxiliary winding, thus keeping the unloader valve 13 open for a short additional period. When the capacitor 7 is fully discharged, the solenoid 14 is deenergized, and the valve 13 closes, applying the full load to the motor 1. By this time the motor has accelerated close enough to its full-load speed to develop sufficient torque to carry the load, and it will continue to run at its normal speed.

It will be seen that the present invention provides an arrangement by which a compressor is automatically unloaded when the driving motor is started, and thus the motor is permitted to come up to speed before the full load is applied, so that the difficulties which have previously been experienced with motors which did not develop sufficient starting torque, under certain conditions, to start the compressor are eliminated, and the motor will always come up to speed. The arrangement herein described provides a very simple and reliable means for accomplishing this result by using the voltage across the capacitor of a capacitor-start motor for actuating the unloader valve. Centrifugal devices have frequently been used for this purpose, and the present invention effects a desirable saving by eliminating such devices since, in effect, it utilizes the speed-responsive switch which is normally present in motors of this type for controlling the unloader valve, thus using this switch for a dual purpose and eliminating the external centrifugal device which has previously been used.

Another important advantage of this invention is the fact that the unloader valve 13 is kept open for a short time after the speed-responsive switch 8 has operated, so that the motor 1 is almost at its normal speed before the full load is applied. This effect results from the fact that when the switch 8 opens, the capacitor 7 is partly or fully charged, and subsequently discharges through the solenoid 14. The length of time that the energization of the solenoid 14 is maintained in this way is dependent, of course, on the rate of discharge of the capacitor 7, and this rate can be predetermined and controlled by the design of the solenoid 14 or by connecting a resistor in series with the solenoid to control the discharge. In this way, the valve 13 can be kept open until the motor 1 has reached substantially its normal full-load speed.

It should now be apparent that a simple and inexpensive but very reliable control means has been provided for controlling the energization or actuation of a device associated with, or driven by, a capacitor-start motor, which is to be actuated, or energized, during starting of the motor.

A specific embodiment of the invention has been shown and described for the purpose of illustration, but it will be obvious that the invention can equally well be applied to other types of equipment, and it may be used, in general, for the actuation of any device associated with a motor of this type which is to be actuated during starting of the motor or which is to be actuated or energized in a manner, or at a time, dependent on the starting of the motor. It will be apparent that this arrangement can be applied to any type of apparatus which can be controlled by electrical means in response to the voltage across the capacitor.

It is to be understood, therefore, that although a specific embodiment of the invention has been shown and described, it is applicable to various other types of auxiliary devices associated with single-phase motors, and is capable of various other embodiments and modifications, and the invention is not limited to the specific embodiment shown for the purpose of illustration, but in its broadest aspects it includes all equivalent embodiments and modifications which come within the scope of the appended claims.

I claim as my invention:

1. In combination, a single-phase induction motor having a main primary winding, an auxiliary primary winding, a capacitor connected in series with said auxiliary primary winding, means for opening the circuit of the auxiliary primary winding and capacitor when the motor reaches a predetermined speed, a device to be actuated during starting of the motor, said device including a solenoid for effecting actuation of the device, and means for energizing said solenoid in response to the voltage across said capacitor.

2. In combination, a single-phase induction motor having a main primary winding, an auxiliary primary winding, a capacitor connected in series with said auxiliary primary winding, means for opening the circuit of the auxiliary primary winding and capacitor when the motor reaches a predetermined speed, and a device to be actuated during starting of the motor, said device including a solenoid for effecting actuation of the device, and said solenoid being connected across said capacitor.

3. In combination, a single-phase induction motor having a main primary winding, an auxiliary primary winding, a capacitor connected in series with said auxiliary primary winding, means for opening the circuit of the auxiliary primary winding and capacitor when the motor reaches a predetermined speed, a driven device driven by said motor, an auxiliary device associated with said driven device, and means for actuating said auxiliary device in response to the voltage across said capacitor.

4. In combination, a single-phase induction motor having a main primary winding, an auxiliary primary winding, a capacitor connected in series with said auxiliary primary winding, means for opening the circuit of the auxiliary primary winding and capacitor when the motor reaches a predetermined speed, a driven device driven by said motor, and an auxiliary device associated with said driven device, said auxiliary device including a solenoid for effecting actuation of the auxiliary device, and said solenoid being connected across said capacitor.

5. In combination, a single-phase induction motor having a main primary winding, an auxiliary primary winding, a capacitor connected in series with said auxiliary primary winding, means for opening the circuit of the auxiliary primary winding and capacitor when the motor reaches a predetermined speed, a compressor driven by said motor, an unloader valve for said compressor, and means responsive to the voltage across said capacitor for actuating said unloader valve.

6. In combination, a single-phase induction motor having a main primary winding, an auxiliary primary winding, a capacitor connected in series with said auxiliary primary winding, means for opening the circuit of the auxiliary primary winding and capacitor when the motor reaches a predetermined speed, a compressor driven by said motor, an unloader valve for said compressor, and a solenoid for actuating said unloader valve, said solenoid being connected across said capacitor to be energized by the voltage across the capacitor.

JOSEPH M. STEIN.

REFERENCES CITED

The following references are of record in the file of this patent:

UNITED STATES PATENTS

| Number | Name | Date |
| --- | --- | --- |
| 231,446 | Presbrey | Aug. 24, 1880 |
| 1,912,463 | Ploeger | June 6, 1933 |
| 1,997,673 | Boothby | Apr. 16, 1935 |
| 2,062,052 | Korlacher | Nov. 24, 1936 |
| 2,193,634 | Lukens | Mar. 12, 1940 |
| 2,300,708 | Sleeter | Nov. 3, 1942 |